Figure 1:
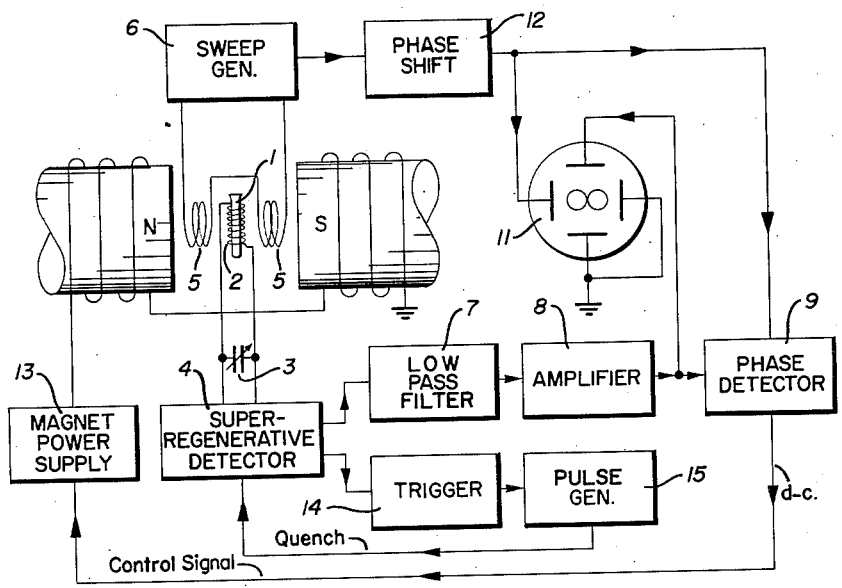

June 12, 1962            W. E. BELL            3,039,045

MAGNETIC FIELD STABILIZING AND MEASURING APPARATUS

Filed Aug. 16, 1956            3 Sheets-Sheet 1

INVENTOR.
William E. Bell
BY Paul B. Hunter
Attorney

June 12, 1962  W. E. BELL  3,039,045
MAGNETIC FIELD STABILIZING AND MEASURING APPARATUS
Filed Aug. 16, 1956  3 Sheets-Sheet 3

INVENTOR.
William E. Bell
BY
Paul B. Hunter
Attorney

United States Patent Office 3,039,045
Patented June 12, 1962

3,039,045
MAGNETIC FIELD STABILIZING AND
MEASURING APPARATUS
William E. Bell, Palo Alto, Calif., assignor to Varian Associates, San Carlos, Calif., a corporation of California
Filed Aug. 16, 1956, Ser. No. 604,542
6 Claims. (Cl. 324—.5)

The present invention relates in general to magnetic field stabilizing and measuring methods and apparatus and more specifically to such apparatus and methods utilizing the principles of gyromagnetic resonance of atoms or portions of atoms within the magnetic field. The present invention is extremely useful for providing a simple and inexpensive apparatus for measuring or stabilizing magnetic fields and is particularly useful in nonhomogeneous magnetic fields.

Heretofore, gyromagnetic field stabilizing devices have been devised which rely for their operation upon the principles of gyromagnetic resonance or forced precession of gyromagnetic bodies within the magnetic field. Such a prior art device is taught by Martin E. Packard in an article entitled "A Proton Controlled Magnetic Field Regulator" appearing in the Review of Scientific Instruments, vol. 19, No. 7, July 1948, pages 435–439. This prior art system is highly sensitive and is capable of stabilizing the magnetic field to one part in a million. However, such high sensitivity has been achieved at the cost of increased complexity.

In general, this system has entailed the use of the crossed coil type gyromagnetic induction system wherein one set of coils is used to induce forced precession or resonance of the gyromagnetic bodies and a second coil, which must be carefully positioned and shielded in an exact manner with respect to the first coil, is used to simultaneously detect the precession of the gyromagnetic bodies. Another type of system which utilizes a single coil detects slight variations in the absorption of energy from the coil at resonance of the gyromagnetic particles. Such a system must be able to detect slight variations from a relatively high power reference point and therefore is generally less sensitive than the crossed coil system.

The present invention provides a relatively simple single coil system for stabilizing or measuring magnetic fields which is more sensitive than prior single coil systems and less complex than previously used crossed coil systems. The increased sensitivity of the present apparatus makes it particularly suitable for observing the weak resonances obtained in magnetic fields which are nonhomogeneous. Such nonhomogeneous magnetic fields are commonly utilized for the focusing and control of beams of charged particles such as are found, for example, in linear accelerators and many types of microwave tubes.

The principal object of the present invention is to provide a novel improved magnetic field measuring and stabilizing method and apparatus which is simple in construction and which is especially sensitive thereby allowing its utilization in relatively nonhomogeneous magnetic fields.

One feature of the present invention is the provision of a novel superregenerative detector means for detecting resonances of the gyromagnetic bodies which serve as the magnetic field intensity sensing element thereby allowing a single coil to be utilized for both inducing and detecting gyromagnetic resonance.

Another feature of the present invention is the provision of a triggered pulse generator serving to quench the superregenerative detector whereby the sensitivity of the superregenerative detector is considerably enhanced.

Another feature of the present invention is the provision of a phase sensitive detector means for detecting the phase shift between a sweep signal and a signal derived from the superregenerative detector whereby a D.C. signal is obtained, the phase and magnitude of which is a measure of the sense and degree to which the magnetic field varies from the preselected reference value.

Another feature of the present invention is the provision of a novel trigger means interposed between the superregenerative detector means and the quencher means whereby the superregenerative detector may be quenched at any predetermined amplitude of oscillation, as desired.

Figure 2:
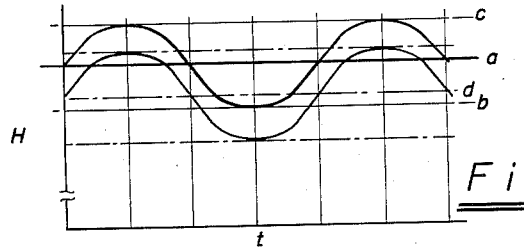
Figure 2A:
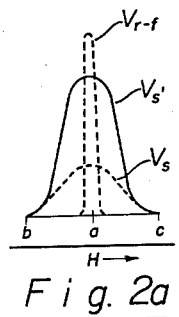
Figure 3:
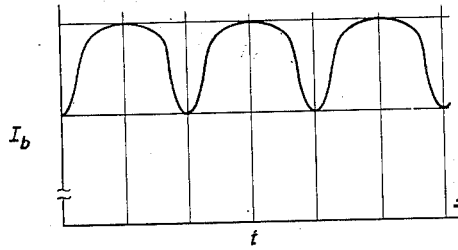
Figure 4:
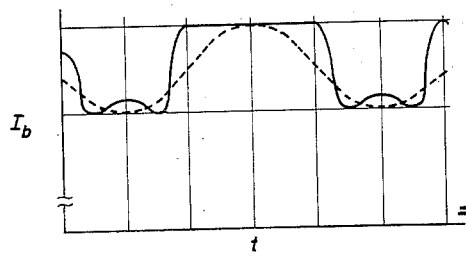
Figure 7:
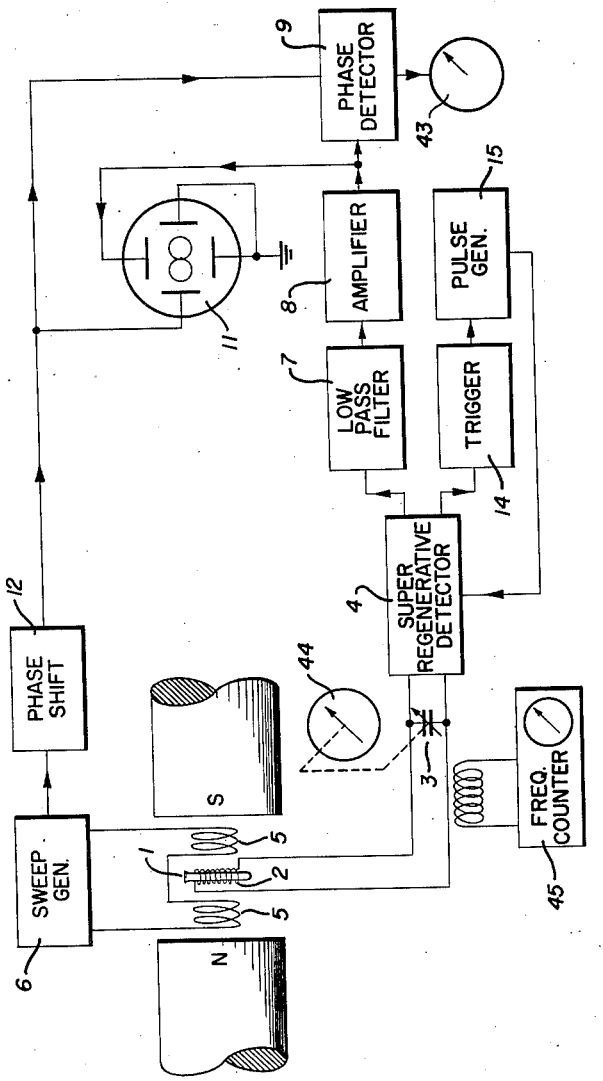
Figure 5:
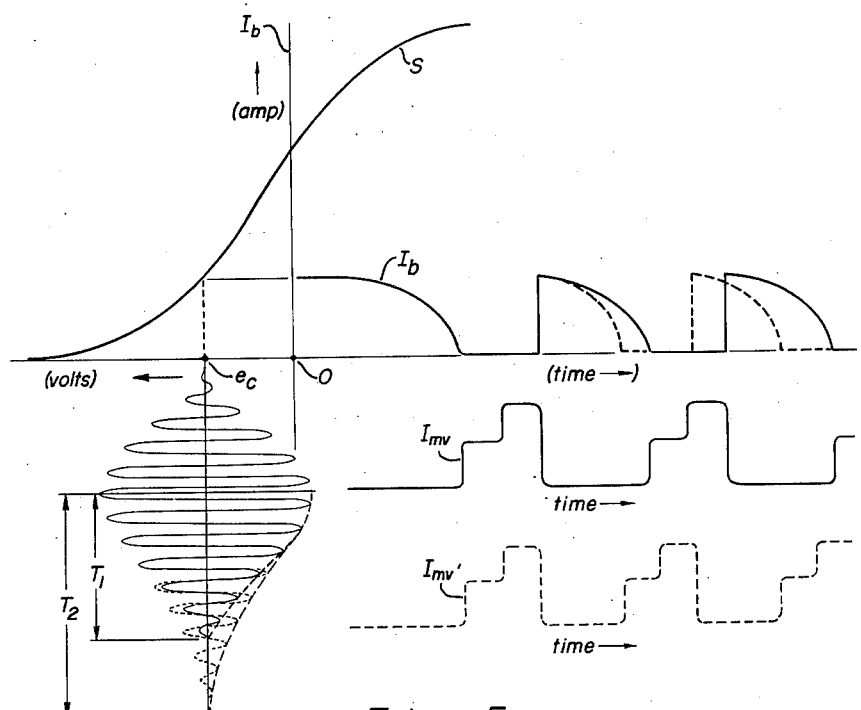
Figure 6:
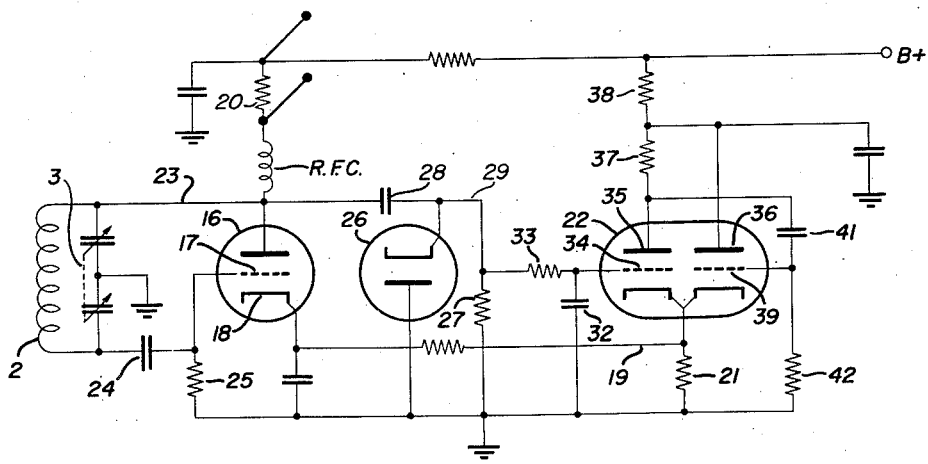

These and other features and advantages of the present invention will be more apparent after a perusal of the following specification taken in connection with the accompanying drawings wherein, FIG. 1 is a schematic block diagram of a novel field stabilizing system which embodies the present invention, FIG. 2 is a plot of magnetic field intensity versus time of a magnetic field which it is desired to stabilize, FIG. 2a is a plot of the amplitude of sample resonance versus magnetic field intensity and includes the exciting R.F. signal, FIG. 3 is a plot of superregenerative D.C. plate current versus time at the reference value of D.C. magnetic field intensity, FIG. 4 is a plot of superregenerative plate current versus time for an average value of D.C. magnetic field intensity different from the reference or standard field intensity, FIG. 5 is a plot showing the grid-to-plate transfer characteristics of the superregenerative detector, FIG. 6 is a circuit diagram of the superregenerative detector, trigger and quencher utilized in the system of FIG. 1, and FIG. 7 is a schematic block diagram of a novel magnetometer system which embodies the present invention.

Referring now to FIG. 1 there is shown in schematic block diagram form a novel magnetic field stabilizing system which embodies the present invention. A gyromagnetic sample of matter 1 such as, for example, water is placed within the magnetic field which it is desired to stabilize. A detector coil 2 is then wound around the gyromagnetic sample of matter 1 in such a manner that the axis of the coil is substantially perpendicular to the direction of the magnetic field. A variable capacitor 3 is then placed in parallel with the detector coil 2 such as to form a parallel resonant circuit making up the tuned grid circuit of a superregenerative detector 4 which will be more fully described below. The parallel superregenerative circuit is then tuned by varying capacitor 3 to a resonant frequency corresponding to the Larmor frequency (gyromagnetic resonance frequency) of the particular gyromagnetic bodies (in this example the water protons in sample 1) withing the desired D.C. value of magnetic field intensity. In other words, with a given gyromagnetic body and a desired value of magnetic field intensity, the superregenerative detector's tuned circuit is tuned to a resonant frequency that will satisfy the relationship that $\omega = \gamma H$ where $\omega$ is the gyromagnetic resonant frequency, $\gamma$ is the gyromagnetic ratio of the particular gyromagnetic body making up the sample and $H$ is the total magnetic field intensity.

It is desirable in the practice of the present invention for the bandwidth of the gyromagnetic resonance line to be very much greater than the bandwidth of the tuned resonant circuit in the input to the superregenerative detector.

From the relationship $\omega = \gamma H$ and assuming that the magnetic field intensity over the sample volume is completely homogeneous one would expect that there is only a single frequency which will excite resonance of the gyromagnetic bodies within the sample volume. If such were the case then the bandwidth or linewidth of the gyromagnetic resonance signal would be extremely small, in the order of a cycle. However, as it was pointed out above for proper operation of the present invention, it is desirable that the linewidth of the gyromagnetic resonance frequency substantially exceed the bandwidth of the tuned resonant circuit.

Therefore, the linewidth of the gyromagnetic sample is broadened by suitably adjusting the constituents of the sample. A suitable material would normally take the form of a salt which when dissolved in the sample will form free ions. An example of such a substance is manganese sulphate, $MnSO_4$.

When a line broadening substance is dissolved in the sample volume the substance ionizes and provides unpaired electrons which have an associated magnetic moment, this magnetic moment couples to the gyromagnetic moments (in the case of water, the proton moments) thereby spreading the particular energy levels involved and allowing energy transitions to occur over a wider band of resonant frequencies. Thus, in a sample which has been suitably doped, it is possible to excite resonance of all the gyromagnetic bodies within the sample volume even when the total field intensity over the sample volume is nonhomogeneous. If we consider the sample to be disposed within a certain nonhomogeneous field it can be seen that the resonance effect of a sample which has had its linewidth broadened is considerably greater than the resonance obtainable from an unbroadened sample similarly situated. The increased signal-to-noise ratio resulting from the higher signal strength obtained by line broadening of the sample is illustrated by FIG. 2a wherein the induced signal voltages for the unbroadened line $V_s$ and the broadened line $V_s'$ are shown as functions of the magnetic field H and compared with the applied R.F. signal $V_{r-f}$.

Referring now to FIG. 2 there is shown a plot of D.C. polarizing magnetic field intensity H versus time $t$. A desired reference or standard value of D.C. magnetic field intensity is designated by reference letter $a$. The tuned R.F. resonant circuit in the input circuit to the superregenerative detector is tuned to the gyromagnetic resonance frequency corresponding to this D.C. reference magnetic field intensity.

Referring now to FIG. 2a it is seen that the amplitude of resonance is greatest at or near the D.C. reference value $a$ and falls off to smaller amplitudes at values of magnetic field intensity corresponding to the upper and lower limits of field intensity that will still produce gyromagnetic resonance. These limiting values of magnetic field intensity are indicated by reference letters $b$ and $c$ of FIGS. 2 and 2a.

Referring now to FIG. 1 sweep coils 5 are positioned straddling the gyromagnetic sample 1 and derive their energizing sweep current from a sweep generator 6. The function of the sweep generator 6 and associated coils 5 is to produce a small magnetic sweep field over the sample volume. The sweep field is confined to a small portion of the total magnetic field so as not to introduce fluctuations in the D..C field in the portion of the field it is desired to stabilize. The sweep frequency may be any convenient low frequency such as, for example, the 60 cycle power line frequency. The sweep field produces a 60 cycle modulation of the average D.C. field intensity. The peak to peak amplitude of this modulation should approximate the amount of field intensity between values $b$ and $c$ (FIGS. 2 and 2a).

When the superregenerative detector 4 is energized, that is, when oscillations are taking place in the R.F. tuned circuit portion of the detector, radio frequency energy at the gyromagnetic resonance frequency corresponding to the reference magnetic field intensity is being applied to the gyromagnetic sample of matter. This R.F. energy will possess a component which is circularly polarized and which will be of the correct phase to induce forced precession or resonance of the preponderance of the gyromagnetic bodies about the D.C. polarizing field.

As the instantaneous value of D.C. magnetic field, in the vicinity of the reference value, is varied, as by the 60 cycle modulations superimposed thereon, the amplitude of the forced precessions will vary. More specifically, when the instantaneous D.C. magnetic field approaches the standard value the amplitude of forced precession will be increased. Correspondingly, when the instantaneous value of D.C. magnetic field intensity differs by a substantial amount from the standard the forced precessional amplitude will be a minimum or zero.

For the special case when the average magnetic field intensity corresponds exactly with the reference D.C. value the 60 cycle modulation will produce two maximums in the precessional signal for every maximum in the modulation signal. Thus, for an average D.C. magnetic field intensity equal to the reference D.C. field intensity, there will be produced a 120 cycle modulation of the gyromagnetic precession signal. This 120 cycle signal is detected by the superregenerative detector 4 and appears as a 120 cycle modulation of the superregenerative plate current (see FIG. 3). Although a particular gyromagnetic resonance signal modulation method and apparatus involving magnetic field modulation has been shown what is taking place is a cyclical variation in the ratio of driving R.F. frequency to the magnetic field intensity to produce successive gyromagnetic resonances of the sample. The R.F. might just as well have been frequency modulated to produce the cyclical varying ratio, in which case the separate sweep coils are not necessary.

A plot of the D.C. superregenerative plate current $I_b$ versus time $t$ for a value of average D.C. magnetic field strength corresponding to the standard magnetic field intensity is shown in FIG. 3. For an average magnetic field intensity which lies below the standard D.C. magnetic field intensity, as shown by reference letter $d$, the 60 cycle field modulation will produce a low frequency nonsinusoidal periodic waveform of precessional amplitude. For this particular mode of operation one cycle of the low frequency precessional signal envelope waveform will have two closely spaced maximum peaks followed by a relatively long period of low or zero precessional amplitude. When this nonsinusoidal periodic precessional signal waveform appears in the plate circuit of the superregenerative detector as a low frequency modulation of the plate current it will have been shifted 180° in phase and have the form as shown in FIG. 4. This nonsinusoidal periodic plate current waveform contains a 60 cycle Fourier component as shown by the dotted line of FIG. 4.

The amplitude and phase of this 60 cycle component depends upon the degree and sense respectively that the average D.C. magnetic field intensity varies or differs from the reference D.C. magnetic field value. From this 60 cycle component of plate current a control signal is derived and utilized for stabilizing the magnetic field.

Referring now to FIG. 1 the low frequency components of the superregenerative plate current are taken from the plate circuit through low pass filter 7 and fed to a low frequency amplifier 8. The output of low frequency amplifier 8 is then fed to one terminal of a phase sensitive detector 9. In addition, a portion of the low frequency signal may be taken from amplifier 8 and fed to the vertical deflecting plates of a cathode ray oscilloscope 11 for visual observation, if desired.

A reference signal at the 60 cycle sweep frequency is derived from sweep generator 6 and fed to a phase shifter 12 wherein the phase may be shifted as desired to compensate for extraneously induced phase shifts elsewhere in the system. This reference 60 cycle sweep signal is then fed to the other input terminal of the phase sensitive detector 9. A portion of the 60 cycle reference output from phase shifter 12 may be fed to the horizontal deflecting plates of the cathode ray oscilloscope 11.

When the 60 cycle sweep signal is compared with the low frequency signals derived from the plate of the superregenerative detector a D.C. potential will appear in the output of the phase sensitive detector 9 the magnitude and phase of which depends upon whether the average value of D.C. magnetic field intensity exceeds or lies below the reference or standard value. This D.C. signal derived from the output of the phase sensitive detector 9 is then fed to the magnet power supply 13 which controls the D.C. current flowing to the electromagnet thereby correcting the magnetic field intensity to the standard or preselected value.

Referring now to FIGS. 1, 5, and 6 the superregenerative detector and associated circuitry will now be described in greater detail. The general operation of the superregenerative detector is as follows: A signal is induced in the tuned input circuit to the superregenerative detector and this signal is amplified by the superregenerative detector and reapplied to the grid circuit in the proper phase and of the proper amplitude to cause the superregenerative detector to break into oscillations of increasing amplitude.

When the amplitude of these oscillations, in the plate circuit, reaches a certain predetermined amplitude as determined by a trigger circuit 14 a signal is derived from the trigger circuit and applied to a pulse generator 15 which generates a pulse of a certain predetermined amplitude and duration which is applied to or fed back to the superregenerative detector in such a manner as to render the superregenerative detector 4 nonoperative. Utilization of a triggered quench for the superregenerative detector considerably enhances the sensitivity of the detector over a case wherein the superregenerative detector is quenched at a predetermined rate. An exemplary triggered quenching frequency of the present invention is between 1 and 5 kilocycles.

FIG. 5 shows the grid-to-plate transfer characteristics of a typical superregenerative tube 16 depicted in FIG. 6. Initially the grid 17 of tube 16 is biased at zero potential. When the B+ voltage is applied to the plate the tube immediately becomes conducting. When tube 16 is conducting a D.C. current will flow through its cathode 18, cathode-to-ground lead 19 and resistor 21 which is common to the cathode-to-ground connection of tube 16 and a one-shot multivibrator 22. At the instant tube 16 becomes conductive the cathode 18 of tube 16 immediately becomes more positive than its grid 17 thereby obtaining an initial negative grid bias for tube 16 corresponding to $e_c$ of FIG. 5.

In the grid circuit to tube 16 noise voltages present will initiate small signals therein which will be amplified and reapplied to the grid 17 by a plate-to-grid feed-back lead 23 in the proper phase to produce regenerative oscillation. Since the grid circuit is tuned to the predetermined gyromagnetic resonance frequency, the superregenerative detector will break into oscillation at this resonant frequency. When oscillations are taking place, R.F. energy will be applied to the gyromagnetic sample of matter 1 within the magnetic field thereby producing forced precession of the gyromagnetic bodies about the D.C. magnetic field.

The oscillations in the tuned grid circuit will build up in amplitude at a fast rate as will the amplitude of the oscillations in the plate circuit. When the positive excursions of the grid R.F. signal become positive with respect to the potential of cathode 18, space current will be intercepted by the grid electrode 17 and grid current will flow therein. Capacitor 24 and resistor 25 in the grid-to-ground leads of the superregenerative tube 16 serve to rectify these positive excursions and to thereby provide an increasing negative potential to the grid 17 with respect to the cathode 18 whereby tube 16 is continuously more negatively biased thereby moving the operating point or quiescent point in a direction of increasing negative grid bias as indicated by the arrow of FIG. 5.

The quiescent plate current $I_b$ will decrease with increasing amplitude of grid signal. The rate at which the quiescent plate current decreases in amplitude will be proportional to the rate at which the signal in the grid circuit increases in amplitude. These grid signals will increase in amplitude until the tube begins to saturate, that is, when the grid signals extend in positive amplitude to values which correspond to saturated portions $s$ of the grid-to-plate transfer characteristic curve. When the tube is saturated the amplitude of the grid signal will not increase further and correspondingly the quiescent value of plate current $I_b$ will not decrease below this point. Since the superregenerative detector 4 detects signals in its grid circuit by changes of its D.C. quiescent plate current, sensitivity is lost if the tube is allowed to operate for any extended period of time at the saturated value.

Therefore, a trigger circuit 14 comprising a diode 26 and resistor 27 is coupled to the superregenerative plate circuit through coupling capacitor 28. The diode 26 serves to rectify the positive excursions of the R.F. plate signal and apply them via lead 29 to an R.C. filter comprising capacitor 32 and resistor 33. The filter feeds a D.C. signal to the initiating grid 34 of the one shot multivibrator 22. By choosing the proper values of resistance and capacitance of elements 27, 32 and 33 it is possible to trigger the one shot multivibrator 22 at any predetermined amplitude of R.F. oscillation.

When the multivibrator 22 is conducting, current will be drawn through the multivibrator tube 22 and through the common cathode bias resistor 21 thereby raising the cathode potential of the superregenerative detector 16 and quenching or cutting off the plate current thereto via an electrical circuit independent of the R.F. feedback circuit of the oscillator tube 16. When the superregenerative detector is quenched, oscillations in its plate circuit cease. Thus, no signals will be rectified by diode 26 and the positive charge accumulated on the grid 34 of the multivibrator 22 will begin to leak off at a rate determined by the time constant of the R.C. elements 27, 32 and 33.

At an instant of time just before multivibrator 22 becomes conductive, the two plates 35 and 36 of multivibrator 22 are at the same positive potential. However, as current begins to flow in the first half of the multivibrator the first plate 35 immediately drops to a lower potential than the second plate electrode 36 due to the potential divider action of resistors 37 and 38 in the plate circuit of the multivibrator. Concurrent with the relative raise in potential of the second plate electrode 36 the second grid 39 of the multivibrator is driven more negative than ground due to the action of the plate-to-grid coupling capacitor 41 and grid-to-ground resistor 42. This negative grid bias on the second half of the multivibrator prevents the immediate transfer of plate current from the first to the second half of the multivibrator.

However, the negative grid bias on the second half of the multivibrator immediately begins to leak off at a rate determined by the time constant of capacitor 41 and resistor 42. When second grid 39 raises in potential to the cut off potential, the second half of the multivibrator becomes conductive and the plate current switches from the first half to the second half of the tube 22.

When the plate current switches to the second half of the multivibrator, the plate potential of the first half of the multivibrator suddenly becomes more positive in potential and then through the combined action of the plate-to-grid coupling capacitor 41 and grid-to-ground resistor 42 the second grid 39 of the multivibrator is driven more positive than ground thereby holding the second half of the multivibrator conductive. However, the positive potential thus applied to the grid 39 begins to leak off at a rate determined by the time constant of capacitor 41 and resistor 42.

The current $I_{mv}$ through the second half of the multivibrator will be substantially greater than the current previously drawn through the first half of the multivibrator due to the potential divider action of resistors 37 and 38 in the plate circuit of the multivibrator. Accordingly, the cathode potential of the multivibrator will be substantially higher than during the first half cycle of multivibrator operation. When the grid 39 of the second half of multivibrator drops in potential a sufficient amount towards ground potential the current in the second half of the multivibrator will be cut off and the multivibrator cycle will be terminated. As the multivibrator cycle is terminated the cathode of the superregenerative tube 16 is lowered in potential to a point where the superregenerative tube again becomes conducting and a new detection cycle is initiated.

During the period when the superregenerative detector tube 16 is rendered nonconductive due to the quenching action of the multivibrator 22 there are two transient oscillating signals of interest present in the grid circuit of the superregenerative detector. One of these transient oscillations is due to the ringing of the tuned parallel resonant circuit of the superregenerative detector.

The circuit transient oscillation will die out in a time $T_1$ proportional to the Q of the parallel resonant circuit. The other transient oscillation of interest is due to the precessing nuclei about the polarizing magnetic field. The precession signal will ring for a longer period of time $T_2$ than the tuned parallel resonant circuit because of the much higher Q of the gyromagnetic resonators.

The quench duration, in other words, the length of time that the superregenerative detector is quenched, is adjusted by the proper selection of time constants associated with the multivibrator 22 such that the quench signal $I_{mv}$ ends and the superregenerative detector becomes conductive (sensitive to signals in its grid circuit) after the parallel resonant circuit has stopped ringing but before the induced nuclear signal, if any, has died out. In this way maximum sensitivity of the superregenerative detector is achieved.

Oscillations of the superregenerative detector will build up in amplitude from the nuclear signal or noise signal whichever is the larger. Accordingly, the time that it takes the amplitude of the R.F. oscillations to reach the predetermined quenching value will be correspondingly less the greater the amplitude of the resonant signal. Shorter R.F. build up time means that the quench frequency (see the dotted curves of $I_{mv}'$ in FIG. 5) will be increased and that the corresponding average D.C. plate current in the superregenerative detector will be decreased. Thus, it can be seen that a modulation of the nuclear signal will produce a similar modulation of the D.C. superregenerative plate current but shifted in phase by 180°. As described above with relation to FIGS. 1, 2, 3, 4 and 2a the modulated superregenerative detector plate current will contain a 60 cycle harmonic component the magnitude and phase of which is a measure of the deviation of the average D.C. field from the standard or reference D.C. field intensity. The low frequency output of the superregenerative detector, modulated at the quench frequency, is derived across resistor 20 and fed to the low pass filter 7.

Although a particular kind of superregenerative detector has been shown and described in relation to the present invention other types of superregenerative detectors may be utilized for inducing and detecting the gyromagnetic signals. Likewise, the rectifier and filter arrangement utilized for deriving the trigger pulse may be replaced by other types of clamping devices whereby a signal is obtained when the R.F. oscillations have reached a certain predetermined amplitude.

A modification of the structure of FIG. 1 will provide a fluxmeter or magnetometer apparatus. The magnetometer embodiment of the present invention is shown in FIG. 7. Essentially, the apparatus is the same as shown in FIG. 1 excepting the output of the phase sensitive detector 9 is fed to a D.C. meter 43. In addition, the tuning capacitor 3 in the input to the superregenerative detector is provided with a calibrated indicator 44 to read frequency or magnetic field intensity, as desired. If a more accurate measurement of the magnetic field is desired a frequency counter 45 may be coupled to the superregenerative detector 4 or associated circuitry and said frequency counter may be calibrated, if desired, in units of magnetic field intensity.

In operation a probe containing the gyromagnetic sample of matter and the associated sweep and detecting coils 5 and 2 is inserted into the magnetic field which it is desired to measure. The tuned circuit is then tuned in frequency as by varying the value of capacitor 3 until a signal is detected on the D.C. meter 43, indicating that the tuned circuit is nearing in frequency the gyromagnetic frequency of the sample of matter. The frequency of the tuned circuit is then adjusted for a zero reading of the D.C. meter 43 thereby indicating coincidence between the gyromagnetic frequency of the sample and the resonant frequency of the superregenerative detector's tuned circuit. The magnetic field strength then may be read from a calibrated dial 44, or, if desired, may be read from a calibrated frequency counter 45.

Although the cathode ray oscilloscope 11 is not required for the proper operation of the present invention the patterns appearing on the cathode ray oscilloscope are helpful in interpreting the operation of the apparatus. More specifically, the cathode ray oscilloscope patterns are useful in determining whether the gyromagnetic resonance of the sample of matter is in coincidence with the center resonant frequency of the tuned superregenerative circuit or whether the gyromagnetic resonance frequency is in coincidence with one of the side bands of the tuned resonant circuit. The tuned resonant circuit will have sidebands corresponding to modulation of the center frequency of the tuned circuit at the quench frequency which may be in the order of a kilocycle.

If the homogeneity of the magnetic field is sufficiently great the magnetometer embodiment of the present invention can be expected to accurately measure the magnitude of the magnetic field to within plus or minus 0.1%.

The volume of gyromagnetic sample required for sensing the magnetic field intensity is a function of the particular type of gyromagnetic sample, the homogeneity of the field, and the magnetic field intensity. When water is used as the gyromagnetic sample and the field intensity is greater than 300 gauss the sensing element including the gyromagnetic sample and associated coils can be placed within a cylindrical container approximately 3/8 of an inch in diameter and 1/2 of an inch in length.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Gyromagnetic resonance apparatus utilizing the principles of gyromagnetic resonance of a sample within a portion of a polarizing magnetic field comprising energy translation means for periodically applying a radio frequency magnetic field to the gyromagnetic sample to thereby produce gyromagnetic resonance of the sample, detecting means for periodically detecting the gyromagnetic resonance including a superregenerative detector means, said superregenerative detector means including an amplifier portion and an R.F. feedback path connected to produce a regenerative oscillator, a triggered quenching means for applying a quenching voltage to said oscillator over an electrical path substantially independent of said R.F. feedback path when the amplitude of signals within said oscillator have reached a certain predetermined amplitude within the substantially linear dynamic range of said amplifier portion of said superregenerative detector thereby greatly enhancing the sensitivity of said apparatus, sweep means for cyclically varying the ratio of the frequency of the applied radio frequency field to the intensity of the polarizing magnetic field to successively produce gyromagnetic resonance of the sample, and phase comparing means for comparing the phase of the cyclically varying ratio to the phase of the successive gyromagnetic resonances to thereby produce a signal in variable accordance with the parameters governing gyromagnetic resonance of the sample of the matter.

2. In an apparatus as claimed in claim 1 wherein the regenerative oscillations of said oscillator build up from an initial value determined by the variable condition which it is desired to measure, said triggered quenching means including a trigger means coupled to said oscillator means and adapted to to be responsive to a predetermined amplitude of oscillation within said oscillator, and a quench means electrically coupled to said oscillator means and adapted to be triggered by said trigger means whereby the oscillations in said oscillator are quenched when they have reached a predetermined amplitude.

3. In an apparatus as claimed in claim 2 wherein said trigger means includes a rectifier means for rectifying the oscillating signal within said oscillator and for applying the rectified signal to said quench means.

4. In an apparatus as claimed in claim 2 wherein said quench means comprises a one shot multivibrator means whereby the duration of the quench signal may be accurately controlled.

5. In an apparatus as claimed in claim 4 including a resistive means common to circuits of both said regenerative oscillator means and said one shot multivibrator means for biasing electrodes of both said oscillator and said multivibrator means toward a cutoff potential when said quench means is in operation.

6. In an apparatus as claimed in claim 2 wherein said quench means includes a timing means whereby the length of the quenching signal may be accurately controlled.

References Cited in the file of this patent
UNITED STATES PATENTS

| Re. 23,769 | Varian | Jan. 12, 1954 |
| Re. 23,950 | Bloch et al. | Feb. 22, 1955 |
| 2,614,216 | Tellier | Oct. 14, 1952 |
| 2,772,391 | Mackey | Nov. 27, 1956 |

OTHER REFERENCES

Whitehead: Super-Regenerative Receivers, Cambridge Press, 1950, pp. 131–157.

Gutowsky et al.: Review of Scientific Instruments, vol. 24, August 1953, pp. 644–652.

Andrew: Nuclear Magnetic Resonance, Cambridge Press, 1955, pp. 53–57, 97–101, 247–261.

Williams: Physica, vol. 27, No. 3–4, March-April 1951, pp. 454–460.

Volkoff et al.: Canadian Journal of Physics, vol. 30, No. 3, 1952, pp. 270 to 289.

Zimmerman et al.: Physical Review, vol. 76, No. 3, August 1949, pp. 350 to 357.

Roberts: The Review of Scientific Instruments, vol. 18, No. 11, November 1947, pp. 845 through 848.

Whitehead: Cited in paper No. 4, pp. 17 to 19, and 111 to 114 additionally relied on.